US009419858B2

(12) United States Patent
Ling et al.

(10) Patent No.: US 9,419,858 B2
(45) Date of Patent: Aug. 16, 2016

(54) METHOD AND SYSTEM FOR SERVICE GROUP MANAGEMENT IN A CABLE NETWORK

(71) Applicant: MaxLinear, Inc., Carlsbad, CA (US)

(72) Inventors: Curtis Ling, Carlsbad, CA (US);
Sridhar Ramesh, Carlsbad, CA (US);
Timothy Gallagher, Encinitas, CA (US)

(73) Assignee: Maxlinear, Inc., Carlsbad, CA (US)

( * ) Notice: Subject to any disclaimer, the term of this patent is extended or adjusted under 35 U.S.C. 154(b) by 156 days.

(21) Appl. No.: 13/948,444

(22) Filed: Jul. 23, 2013

(65) Prior Publication Data

US 2014/0022943 A1 Jan. 23, 2014

Related U.S. Application Data

(60) Provisional application No. 61/674,742, filed on Jul. 23, 2012.

(51) Int. Cl.
*H04L 12/24* (2006.01)
*H04L 1/00* (2006.01)

(52) U.S. Cl.
CPC .......... *H04L 41/0823* (2013.01); *H04L 1/0026* (2013.01); *H04L 1/0009* (2013.01)

(58) Field of Classification Search
None
See application file for complete search history.

(56) References Cited

U.S. PATENT DOCUMENTS

| | | | | |
|---|---|---|---|---|
| 5,563,918 A * | 10/1996 | Waldschmidt | ......... | H04B 17/20 375/267 |
| 6,275,483 B1 * | 8/2001 | Papasakellariou | . | H04B 1/70753 370/335 |
| 6,421,327 B1 * | 7/2002 | Lundby | ................. | H04W 52/24 370/310 |
| 6,560,225 B1 * | 5/2003 | Czajkowski et al. | ......... | 370/356 |
| 6,891,858 B1 * | 5/2005 | Mahesh et al. | ................ | 370/480 |
| 6,898,755 B1 * | 5/2005 | Hou | ............................... | 714/784 |
| 7,761,049 B2 * | 7/2010 | Zeng | ...................... | G01V 1/223 370/252 |
| 8,488,514 B2 * | 7/2013 | Cai | ........................ | H04W 36/30 370/315 |
| 8,743,933 B2 * | 6/2014 | Prodan et al. | ................. | 375/222 |
| 9,025,954 B2 * | 5/2015 | Fang | ................... | H04L 12/2801 370/210 |
| 2002/0062486 A1 * | 5/2002 | Park | ............................. | 725/111 |
| 2002/0186459 A1 * | 12/2002 | DeGrange, Jr. | .... | H04B 10/0775 359/341.4 |
| 2003/0002450 A1 * | 1/2003 | Jalali | .................... | H04B 7/0434 370/294 |
| 2003/0043732 A1 * | 3/2003 | Walton | .................. | H04L 1/0009 370/208 |
| 2003/0053419 A1 * | 3/2003 | Kanazawa et al. | ............ | 370/252 |
| 2003/0177502 A1 * | 9/2003 | Kolze et al. | .................... | 725/111 |
| 2003/0199283 A1 * | 10/2003 | Busch | ............................ | 455/513 |

(Continued)

*Primary Examiner* — Dung B Huynh
(74) *Attorney, Agent, or Firm* — McAndrews, Held & Malloy (57) ABSTRACT

A cable modem termination system (CMTS) may determine, for a plurality of cable modems served by the CMTS, a corresponding plurality of SNR-related metrics. The CMTS may assigning the modems among a plurality of service groups based on the SNR-related metrics. For any one of the modems, the CMTS may configure physical layer communication parameters to be used by the one of the modems based on a SNR-related metric of a service group to which the one of the modems is assigned. The physical layer communication parameters may include one or more of: transmit power, receive sensitivity, timeslot duration, modulation type, modulation order, forward error correction (FEC) type, and FEC code rate. The CMTS and the modems may communicate using orthogonal frequency division multiplexing (OFDM) over a plurality of subcarriers, and the physical layer communication parameters may be determined on a per-subcarrier basis.

18 Claims, 7 Drawing Sheets

(56) References Cited

U.S. PATENT DOCUMENTS

| | | | |
|---|---|---|---|
| 2003/0223481 A1* | 12/2003 | Jones et al. ............... 375/227 |
| 2003/0236071 A1* | 12/2003 | Ito .............................. 455/59 |
| 2004/0218568 A1* | 11/2004 | Goodall et al. ............ 370/332 |
| 2005/0122996 A1* | 6/2005 | Azenkot et al. ........... 370/477 |
| 2005/0135253 A1* | 6/2005 | Cai et al. ................... 370/236 |
| 2005/0185824 A1* | 8/2005 | Chen ..................... G06K 9/3241 382/103 |
| 2005/0213579 A1* | 9/2005 | Iyer et al. ................ 370/395.2 |
| 2006/0008020 A1* | 1/2006 | Blankenship et al. ..... 375/261 |
| 2007/0202904 A1* | 8/2007 | Cheng et al. .............. 455/509 |
| 2007/0253388 A1* | 11/2007 | Pietraski ............... H04J 13/00 370/338 |
| 2009/0016420 A1* | 1/2009 | Kwak et al. ............... 375/227 |
| 2009/0040942 A1* | 2/2009 | Yang .......................... 370/253 |
| 2009/0215403 A1* | 8/2009 | Currivan et al. ........... 455/69 |
| 2009/0219856 A1* | 9/2009 | Richardson .......... H04W 72/044 370/328 |
| 2010/0002575 A1* | 1/2010 | Eichinger et al. ......... 370/210 |
| 2010/0172316 A1* | 7/2010 | Hwang et al. ............. 370/330 |
| 2011/0051607 A1* | 3/2011 | Begen ........................ 370/252 |
| 2011/0188852 A1* | 8/2011 | Stodola ................... H04J 14/02 398/27 |
| 2011/0306380 A1* | 12/2011 | Zavadsky ................ H04W 24/02 455/522 |
| 2012/0269242 A1* | 10/2012 | Prodan .................... H04L 12/2801 375/222 |
| 2013/0021931 A1* | 1/2013 | Kim ........................ H04L 1/0003 370/252 |
| 2013/0024753 A1* | 1/2013 | Masuda .................. H04L 1/005 714/799 |
| 2013/0100843 A1* | 4/2013 | Croak et al. ............... 370/252 |
| 2013/0107921 A1* | 5/2013 | Prodan ....................... 375/222 |
| 2013/0114480 A1* | 5/2013 | Chapman et al. .......... 370/282 |
| 2013/0266310 A1* | 10/2013 | Fox ........................ H04L 25/08 398/25 |
| 2014/0022926 A1* | 1/2014 | Ling et al. ................. 370/252 |
| 2014/0133330 A1* | 5/2014 | Chapman ................... 370/252 |
| 2014/0169431 A1* | 6/2014 | Arambepola ......... H04L 27/0006 375/227 |
| 2014/0286203 A1* | 9/2014 | Jindal .................... H04W 16/14 370/278 |
| 2015/0071161 A1* | 3/2015 | Salhab .................. H04B 7/15592 370/315 |
| 2015/0288498 A1* | 10/2015 | Kliger ..................... H04J 1/02 370/491 |

\* cited by examiner

METHOD AND SYSTEM FOR SERVICE GROUP MANAGEMENT IN A CABLE NETWORK

PRIORITY CLAIM

This patent application makes reference to, claims priority to and claims benefit from U.S. Provisional Patent Application Ser. No. 61/674,742 titled "Method and System for Service Group Management in a Cable Television Network" and filed on Jul. 23, 2012.

The entirety of the above-mentioned application is hereby incorporated herein by reference.

INCORPORATION BY REFERENCE

This application also makes reference to:

U.S. Patent Application Publication 2013/0094416 (application Ser. No. 13/553,3281) titled "Method and System for Client-Side Message Handling in a Low-Power Wide Area Network," and filed on Jul. 19, 2012;

U.S. Patent Application Publication 2013/0097240 (application Ser. No. 13/485,0341) titled "Method and System for Server-Side Message Handling in a Low-Power Wide Area Network," and filed on May 31, 2012;

U.S. Patent Application Publication 2013/0094551 (application Ser. No. 13/553,175) titled "Method and System for a Low-Power Client in a Wide Area Network," and filed on Jul. 19, 2012;

U.S. Patent Application Publication 2013/0094415 (application Ser. No. 13/553,195) titled "Method and System for Server-Side Handling of a Low-Power Client in a Wide Area Network," and filed on Jul. 19, 2012;

U.S. Patent Application Publication 2014/0022926 titled "Method and System for a High Capacity Cable Network," and filed on the same date as this application; and U.S. Patent Application Publication 2014/0026176titled "Method and System for Noise Suppression in a Cable Network," and filed on the same date as this application.

The entirety of each of the above-mentioned applications is hereby incorporated herein by reference.

FIELD OF THE INVENTION

Certain embodiments of the invention relate to cable television networks. More specifically, certain embodiments of the invention relate to a method and system for service group management in a cable television network.

BACKGROUND OF THE INVENTION

Convention cable television networks can be inefficient and have insufficient capacity. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for service group management in a cable television network, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Figure 1:
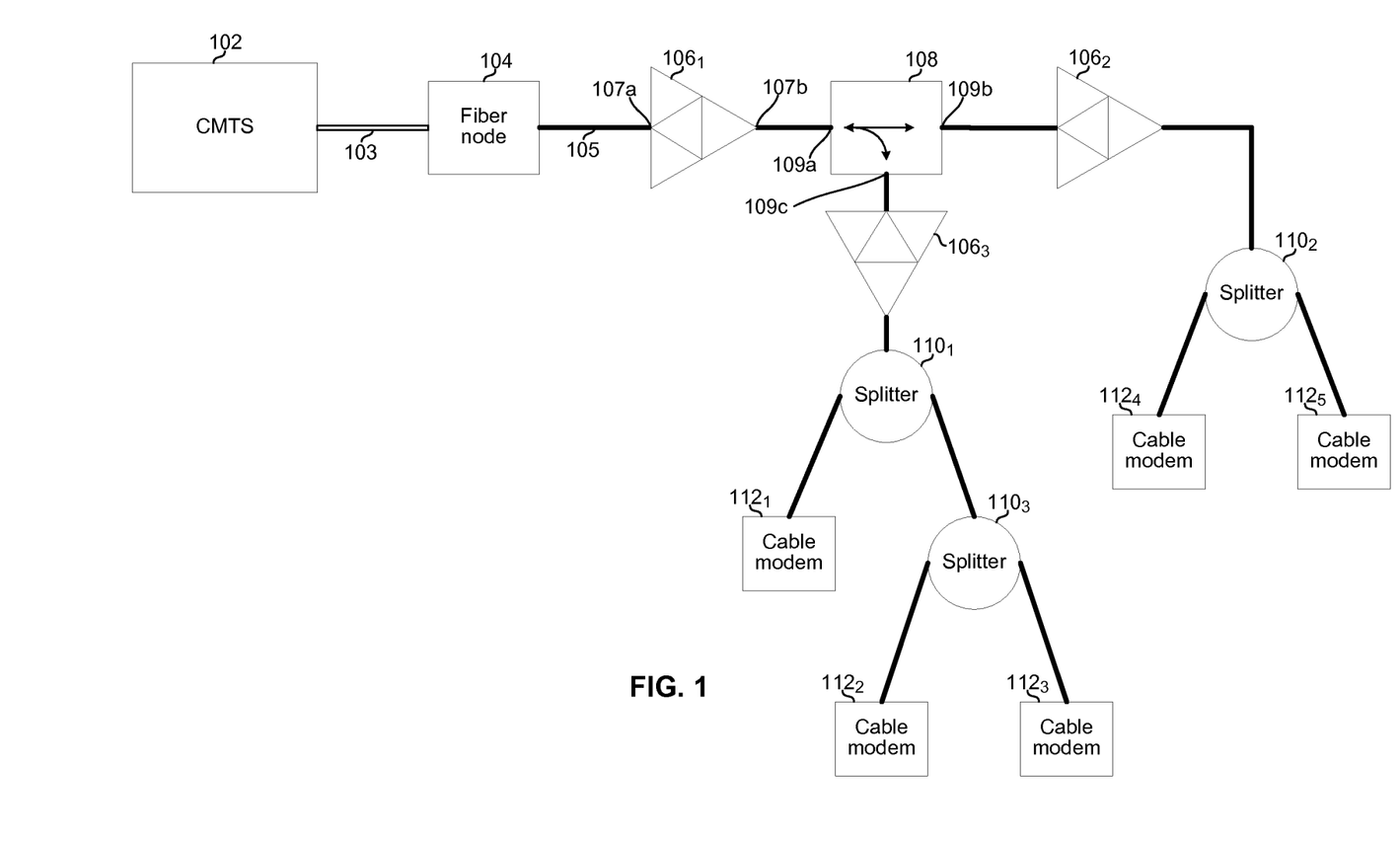
FIG. 1 is a diagram of an example cable/DOCSIS network.

FIG. 1 is a diagram of an example cable/DOCSIS network. The example network comprises a cable modem termination system (CMTS) 102, a fiber node 104, amplifiers $106_1$-$106_3$, a directional coupler 108, splitters $110_1$-$110_3$, and cable modems (CMs) $112_1$-$112_5$.

The CMTS 102 may comprise circuitry operable to manage connections to the CMs $112_1$-$112_5$. This may include, for example: participating in ranging operations to determine physical layer parameters used for communications between the CMTS 102 and CMs $112_1$-$112_5$; forwarding of dynamic host configuration protocol (DHCP) messages between a DHCP server and the CMs $112_1$-$112_5$; forwarding of time of day messages between a time of day server and the CMs $112_1$-$112_5$; directing traffic between the CMs $112_1$-$112_5$ other network devices (e.g., Ethernet interfaces of the CMTS 102 may face the Internet, Optical RF interfaces of the CMTS 102 may face the CMs, and the CMTS may direct traffic between and among the Ethernet and Optical RF interfaces); and managing registration of the CMs $112_1$-$112_5$ to grant the cable modems network (e.g., Internet) access. The registration process for a CM $112_X$ (X between 1 and 5 for the example network of FIG. 1) may comprise the CM 112 sending a registration request along with its configuration settings, and the CMTS 102 accepting or rejecting the cable modem based on the configuration settings. The registration process may additionally comprise an exchange of security keys, certificates, or other authentication information.

The fiber node 104 may comprise circuitry operable to convert between optical signals conveyed via the fiber optic cable 103 and electrical signals conveyed via coaxial cable 105.

Each of the amplifiers $106_1$-$106_3$ may comprise a bidirectional amplifier which may amplify downstream signals and upstream signals, where downstream signals are input via upstream interface 107a and output via downstream interface 107b, and upstream signals are input via downstream interface 107b and output via upstream interface 107a. The amplifiers $106_1$, which amplifies signals along the main coaxial "trunk" may be referred to as a "trunk amplifier." The amplifiers 1062 and 1063 which amplify signals along "branches" split off from the trunk may be referred to as "branch" or "distribution" amplifiers.

The directional coupler 108 may comprise circuitry operable to direct downstream traffic incident on interface 109a onto interfaces 109b and 109c, and to direct upstream traffic incident on interfaces 109b and 109c onto interface 109a. The directional coupler 108 may be a passive device.

Each of the splitters $110_1$-$110_3$ may comprise circuitry operable to output signals incident on each of its interfaces onto each of its other interfaces. Each of the splitters $110_1$-$110_3$ may be a passive device.

Each of the cable modems (CMs) $112_1$-$112_5$ may comprise circuitry operable to communicate with, and be managed by, the CMTS 1102 in accordance with one or more standards (e.g., DOCSIS). Each of the CMs $112_1$-$112_5$ may reside at the premises of a cable subscriber.

The components (including, fiber optic cables, coaxial cables, amplifiers, directional couplers, splitters, and/or other devices) between the CMTS and the CMs may be referred to as a hybrid fiber coaxial (HFC) network. Any of the amplifiers, directional coupler, and splitters may be referred to generically as a coupling device.

Figure 2A:
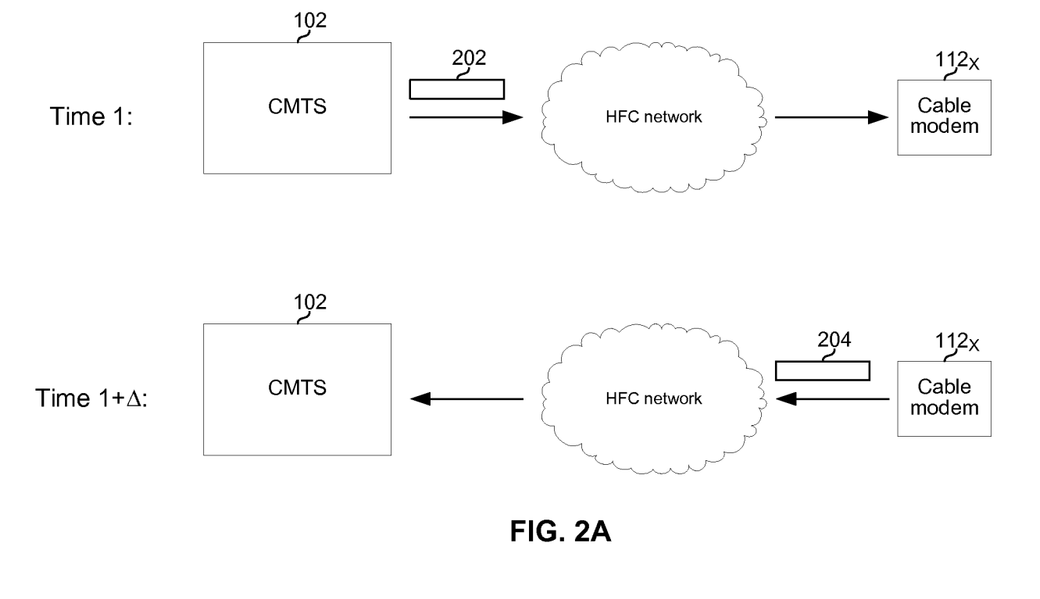
FIG. 2A depicts an example method of determining locations of CMs within the HFC network.

FIG. 2A depicts an example method of determining locations of CMs within the HFC network. As shown in FIG. 2A, to determine one or more measured performance metric(s) (e.g., an SNR-related metric such as SNR at a particular frequency or SNR over a range of frequencies (an SNR profile), noise levels, strength of desired signals, and/or the like) for any particular CM $112_X$, the CMTS 102 may transmit, at time 1, a message 202 that is destined (unicast, multicast, or broadcast) for the CM $112_X$ and that functions as a probe to enable determination of the metric(s) for the CM $112_X$. The message 202 may be sent on multiple channels spanning multiple frequencies. Similarly, where OFDM is used for communications between the CMTS 102 and the CM $112_X$, the message 202 may be transmitted on each subcarrier, or may be sent on a subset of subcarriers and then interpolation may be used for determining the SNR of subcarriers on which the message 202 was not sent.

Figure 2B:
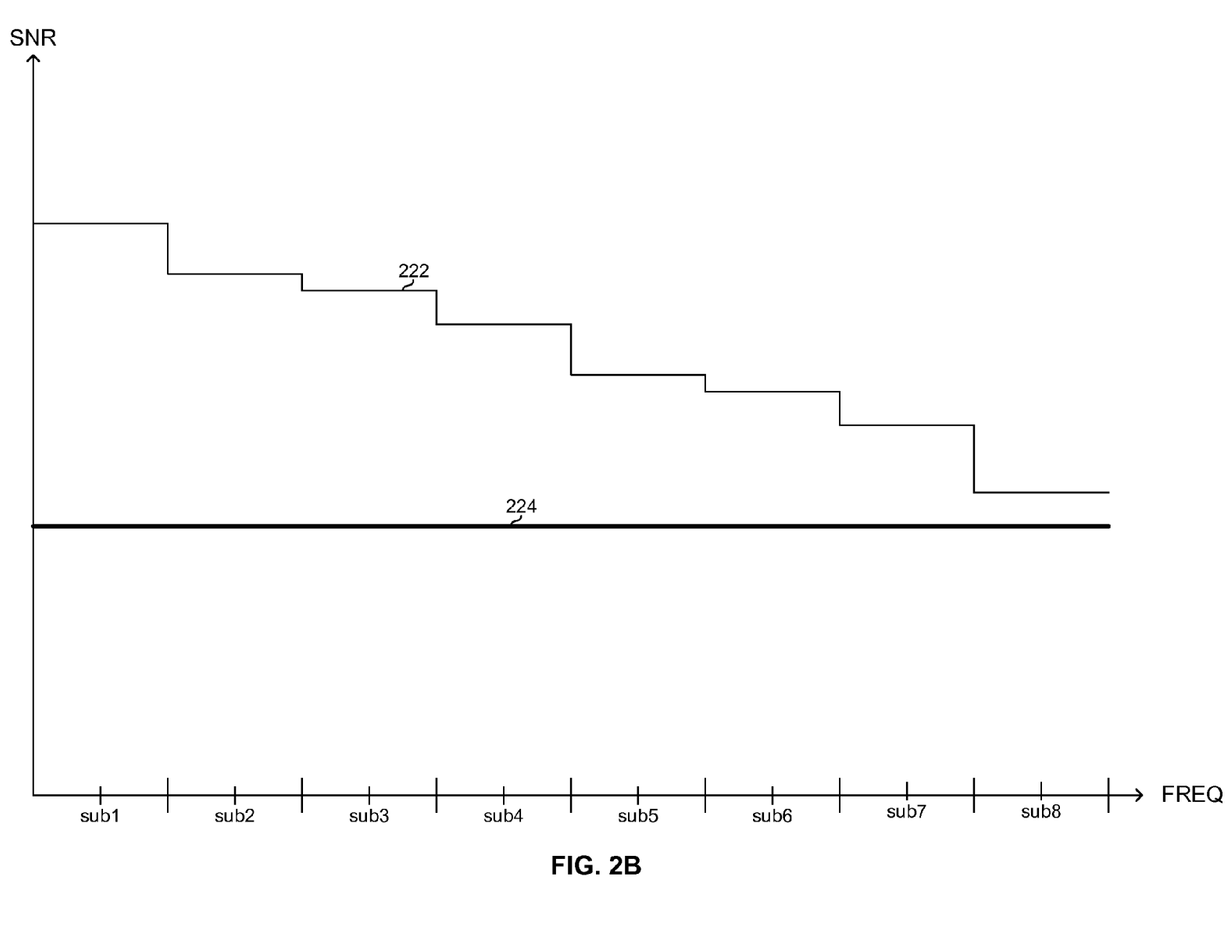
FIGS. 2B and 2C depict signal-to-noise ratio (SNR) versus frequency profiles for an example cable/DOCSIS network.

The message 202 may be transmitted with such encoding, modulation, and transmit power such that even a CM $112_X$ with a worst-case performance metric(s) can receive the message and accurately measure the metric(s). In this regard, FIG. 2B shows a SNR versus frequency graph for an example HFC network that uses eight channels/subcarriers. The line 222 in FIG. 2B represents a composite worst-case SNR profile for one or more CM(s) in the HFC network to which the message 202 is destined. For example, line 222 may be a SNR profile for a single CM $112_X$ to which the message 202 is to be unicast. As another example, the line 222 may be a composite worst-case SNR profile for a plurality of CMs 112 of a particular service group to which the message 202 is to be multicast. As another example, the line 222 may be a composite worst-case SNR profile for all CMs of an HFC network handled by the CMTS 102 to which the message 202 is to be broadcast. The message 202 may be transmitted such that the minimum SNR needed to receive and accurately measure the SNR profile is below the line 222 (e.g., SNR needed for receiving the message 202 may be the line 224).

Upon receipt of the message 202, a CM $112_X$ may measure, over the channels/subbands on which the message was sent, one or more metrics (e.g., SNR versus frequency profile) for the transmission 202. The CM $112_X$ may then report the metrics(s) back to the CMTS 102 via a message 204. In an example implementation, the message 202 may contain information about when and/or how the CM(s) are supposed to report their metric(s) (e.g., SNR profiles) back to the CMTS 102. In this regard, the message 202 may contain information that is the same as and/or or analogous to what may be found in a MAP, UCD, and/or other MAC management message defined in a DOCSIS standard. Accordingly, the message 202 may have specified a format of the message 204 and that the message 204 is to be transmitted at time T+A.

Once the metric(s) of one or more CMs are known to the CMTS 102, physical layer communication parameters to be used for communications between the CMTS 102 and the CMs 112 may be determined based on the metric(s). In this regard, physical layer communication parameters may be determined per-CM based on each CM's respective metric(s) (e.g., each CM's SNR profile), per-service-group based on a composite metric(s) of the CM(s) assigned to that service group (e.g., composite SNR profile for the CM(s) of that service group), per physical region of the HFC network based on a composite metric of the CMs located in that physical region (e.g., composite SNR profile for the CM(s) in that physical region), and/or the like. Furthermore, once the metric(s) of a CM $112_X$ is determined, the CMTS 102 may assign that CM $112_X$ to one or more service groups based on its metric(s), as, for example, described below with reference to FIG. 4A. Example physical layer parameters include: encoding parameters, modulation parameters, transmit power, receive sensitivity, timeslot duration, channel(s) or subcarrier(s) on which to listen, channel(s) or subcarrier(s) on which to transmit, and/or the like. Example encoding parameters include: type of forward error correction (FEC) to be used (e.g., Reed-Solomon, LDPC, etc.), FEC block size, FEC code rate, etc. Example modulation parameters include: type of modulation (e.g., frequency shift keying (FSK), phase shift keying (PSK), quadrature amplitude modulation (QAM), etc.), modulation depth, modulation order, etc.

In an example implementation, the transmission of messages 202, the calculation of metrics, such as SNR profile, by the CM(s), the transmission 204, and subsequent configuration of physical layer parameters based on the metric(s) may take place in parallel with other operations performed during the registration/ranging process.

Figure 2C:
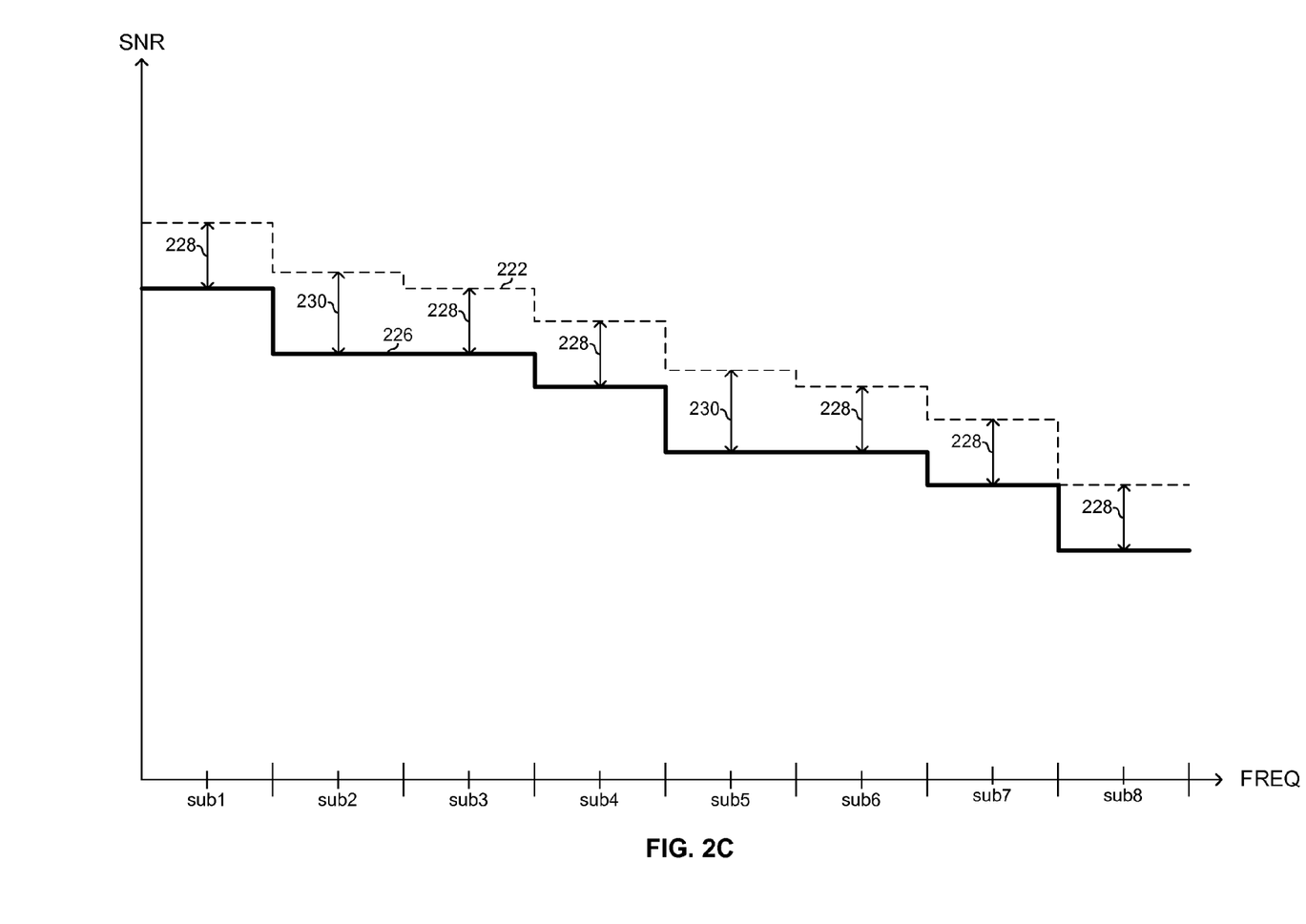

Referring now to FIG. 2C, there is again shown the line 222 which represents the applicable SNR profile (e.g., an individual SNR profile if configuring physical layer parameters per CM, a composite SNR profile for a service group if configuring physical layer parameters per service group, or a composite SNR profile for a particular physical region). Also shown is a line 226 corresponding to SNR utilization for communications with the CM(s) associated with the profile 222. Assuming the distance 228 is the minimum desired headroom, then the physical layer communication parameters resulting in line 226 are nearly optimal in the sense that there is minimal headroom on each of channels/subbands 1, 3, 4, 6, 7, 8, and only slightly more than minimal headroom on channels/subbands 2 and 5.

Physical layer parameters may be configured/coordinated using upstream and/or downstream MAP messages, upstream channel descriptors (UCDs), other MAC management messages defined in DOCSIS protocols, and/or purpose-specific messages tailored to configuring the parameters based on measured performance metrics such as SNR profiles as described in this disclosure.

Figure 3A:
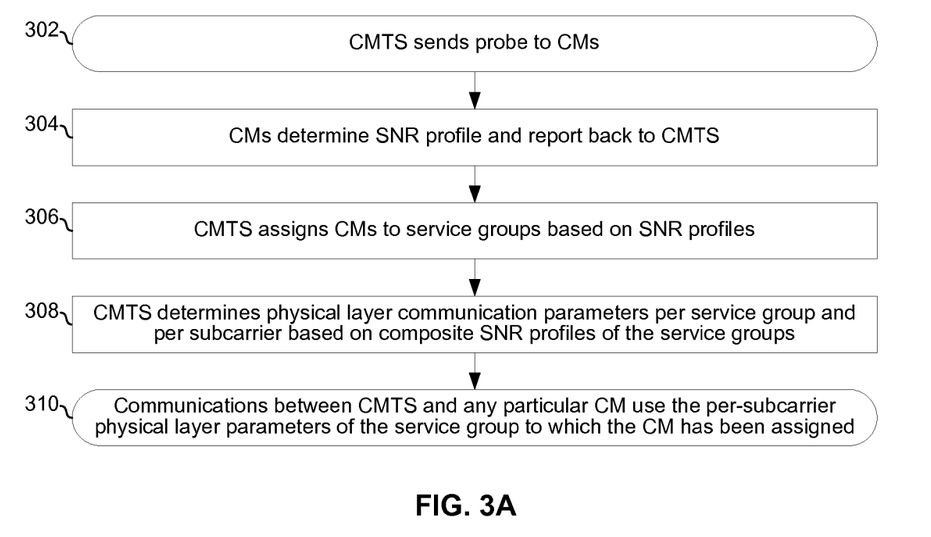
FIG. 3A is a flowchart illustrating an example process for configuring a cable/DOCSIS HFC network based on measured performance metrics.

FIG. 3A is a flowchart illustrating an example process for configuring a cable/DOCSIS HFC network based on SNR profiles. For clarity of illustration the process is described with reference to the network of FIG. 1 and the messages of FIG. 2A. The process begins with block 302 in which the CMTS 102 sends one or more probe messages 202 to the CMs $112_1$-$112_5$. In block 304, each of the CMs $112_1$-$112_5$ determines its respective SNR profile based on a received one of the messages 202, and reports the SNR profile back to the CMTS 102 in the form of a message 204. In block 306, the CMTS 102 assigns the CMs to service groups based on the SNR profiles.

In block 308, physical layer communication parameters are determined per service group and per channel/subcarrier. For example, for any particular service group, the modulation order and FEC code rate to be used on a particular subcarrier may be determined based on the worst case SNR for that subcarrier among the CMs in that particular service group. Thus, it can be seen that grouping CMs based on SNR profiles may enable configuring physical layer communications parameters to such that one or more communication parameters (throughput, reliability, etc.) is optimal, or near-optimal, for all of the CMs in the service group. For example, without such grouping by SNR profile, one CM in a particular service group may have substantially lower SNR on one or more channels/subcarriers. As a result, all CMs in that particular service group may be forced to use physical layer parameters supported by this "lowest common denominator" CM. This may result in a lot of wasted capacity for the remaining CMs.

To illustrate with a specific example: assume that CMs $112_1$, $112_4$, and $112_5$ of FIG. 1 have sufficient SNR on channel z to support 64-QAM on channel z, but that CMs $112_2$ and $112_3$ only have sufficient SNR on channel z to support 16-QAM. If $112_1$ is assigned to the same service group as $112_2$ or $112_3$, then $112_1$ may be forced to use 16-QAM on channel z. Conversely, if $112_1$, $112_4$, and $112_5$ are assigned to a first service group and $112_2$ and $112_3$ are assigned to a second service group, then the first service group consisting of $112_1$, $112_4$, and $112_5$ can use 64-QAM on channel z while the second service group consisting of $112_2$ and $112_3$ uses 16-QAM on channel z.

In block 310, communications between the CMTS 102 and any particular service group use the per-service-group and per-subcarrier/channel physical layer parameters determined in block 308.

Figure 3B:
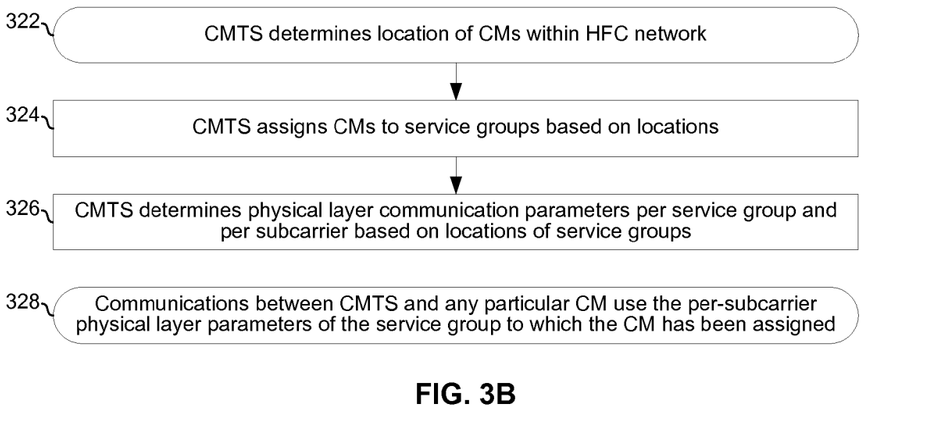
FIG. 3B is a flowchart illustrating an example process for configuring a cable/DOCSIS HFC network based on location of CMs within the network.

FIG. 3B is a flowchart illustrating an example process for configuring a cable/DOCSIS HFC network based on location of CMs within the network. For clarity of illustration, and as a non-limiting example, the process is described with reference to the network of FIG. 1 and the messages of FIG. 2B. The process begins with block 322 in which the CMTS 102 determines a location of each of the CMs $112_1$-$112_5$ in the network. Location of a CM $112_X$ may be characterized in a variety of ways including, for example: total distance of fiber and/or coaxial cable between the CMTS 102 and the CM $112_X$, total attenuation between the CMTS 102 and the CM $112_X$, which trunk amplifier(s) are upstream of the CM $112_X$, how many coupling elements (amplifiers, splitters, directional couplers, etc.) are between the CMTS 102 and the CM $112_X$, GPS coordinates, and street address. In block 324, the CMTS 102 assigns the CMs $112_1$-$112_5$ to service groups based on their determined locations. Blocks 326 and 328 are substantially similar to blocks 308 and 310, respectively, of FIG. 3A.

The locations of the CMs $112_1$-$112_5$ may be determined by, for example, transmitting sounding signals into the network. In order to characterize the channel with more precision, the channel sounding signal may be sent repeatedly over an interval of time and the CMs may average multiple measurements over the time interval until they can resolve identifying characteristics in the signal which indicate, for example, how many branch amplifiers and/or other coupling elements that the signal traveled through to reach the CM. In another example implementation, the CMTS may communicate with a server that stores subscriber information that associates the CMs with their geographic location (e.g., street address).

While FIGS. 3A and 3B depict SNR profiles and location as two separate bases on which to assign CMs to service groups, the two may be used in combination.

Figure 4A:
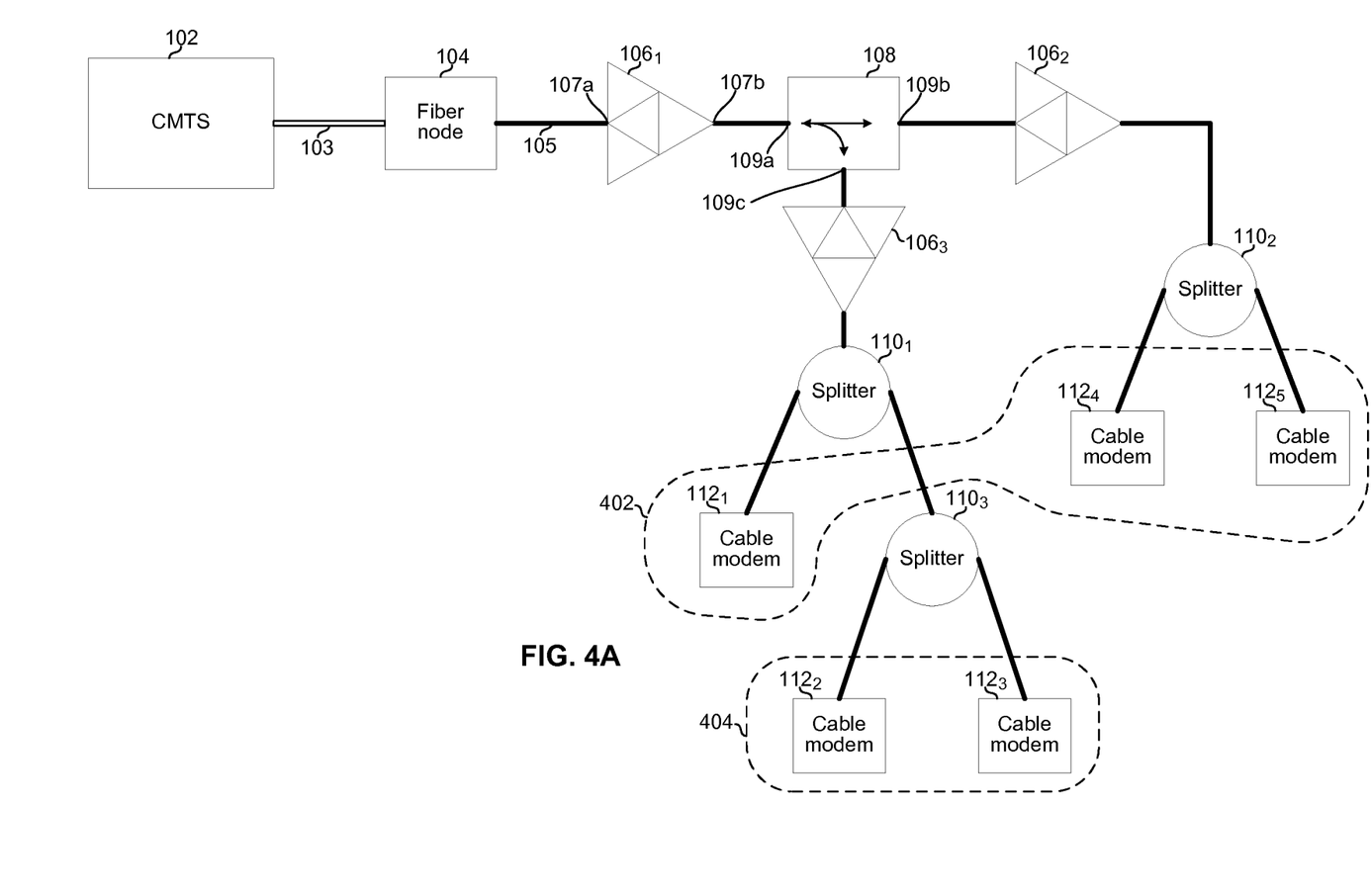
FIGS. 4A and 4B illustrate the network of FIG. 1, with different groupings of CMs based on one or both of: measured performance metric(s) and location within the HFC network.
Figure 4B:
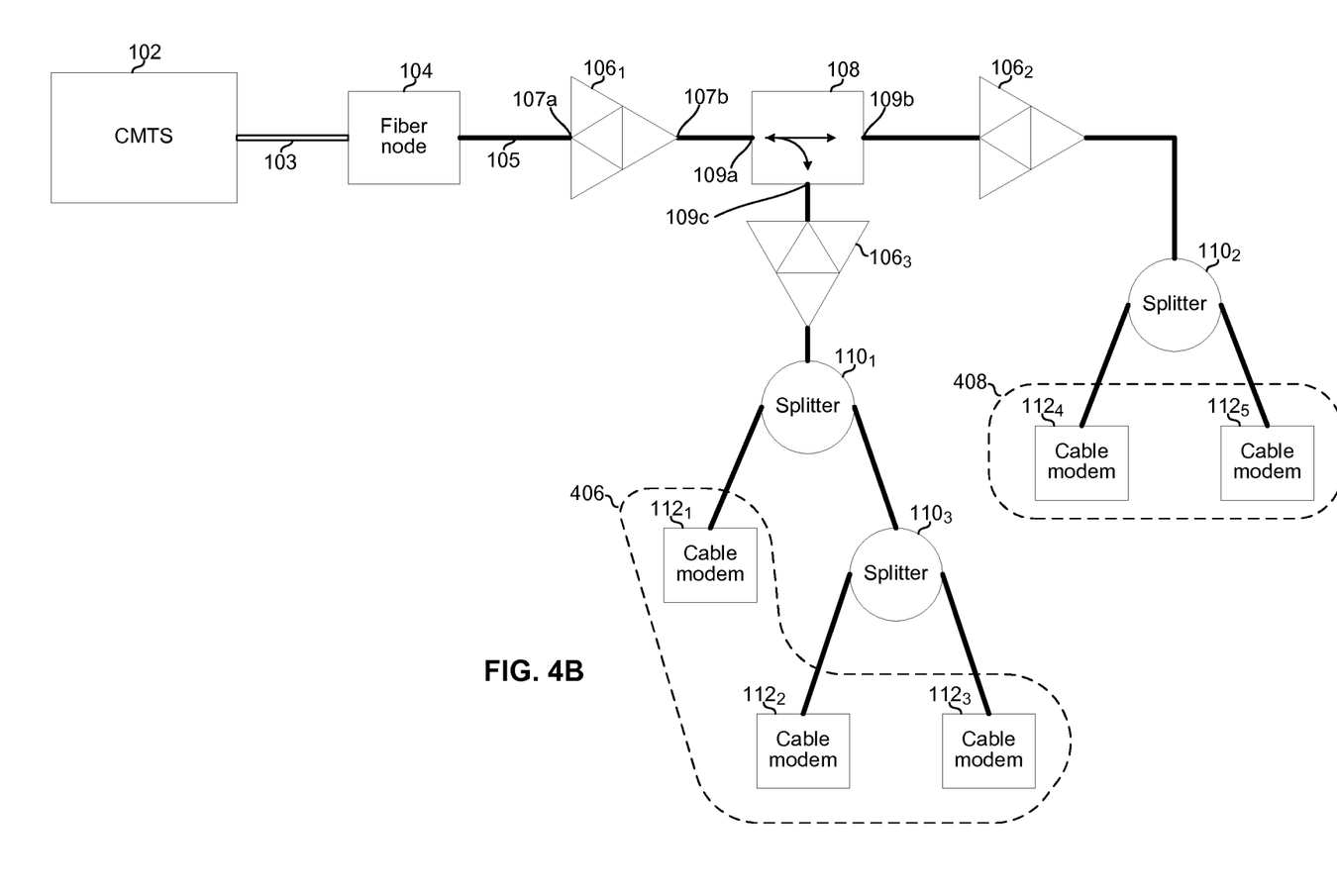

FIGS. 4A and 4B illustrate the network of FIG. 1, with different groupings of CMs based on one or both of: measured performance metric(s) and location within the HFC network.

In the example of FIG. 4A, CMs $112_1$, $112_4$, and $112_5$ are assigned to service group 402 and CMs $112_2$ and $112_3$ are assigned to service group 404. The assignment of FIG. 4A may result from, for example, assigning CMs based on the number of coupling elements between the CMTS 102 and the CMs—four each for CMs $112_1$, $112_4$, and $112_5$; five each for CMs $112_2$ and $112_3$. The number of coupling elements may be determined based on, for example, measured performance metrics (e.g., SNR profile) of the CMs and/or address or GPS information associated with the CMs. Alternatively, the assignment of FIG. 3A may result from, for example, assigning the CMs to service groups based directly on their respective measured performance metric(s) (e.g., the extra device in the path between CMTS 102 and CMs $111_2$ and $112_3$ may cause CMs $112_2$ and $112_3$ to have significantly poorer SNR).

In the example of FIG. 4B, CMs $112_1$, $112_2$, and $112_3$ are assigned to service group 406 and CMs $112_4$ and $112_5$ are assigned to service group 408. The assignment of FIG. 4B may result from, for example, assigning CMs based on which trunk amplifiers are downstream of the CMs. Alternatively, the assignment of FIG. 3A may result from, for example, assigning the CMs to service groups based directly on their respective measured performance metric(s) (e.g., the distance between CMTS 102 and CMs $112_4$ and $112_5$ may be substantially greater than the distance between the CMTS 102 and the CMs $112_1$, $112_2$, and $112_3$, thus resulting in poorer SNR in CMs $112_4$ and $112_5$).

Grouping CMs according to which trunk or distribution amplifiers are upstream of them may enable duty cycling power branch and/or distribution amplifiers. For example, when a CM in service group 406 is the talker, the upstream path through amplifier $106_2$ may be disabled such that noise from group 408 does not interfere with transmissions from the talker of service group 406. Grouping CMs according to which trunk or distribution amplifier(s) serve(s) them may enable using more efficient physical layer parameters. For example, where there is a relatively long distance of cable between amplifier $106_1$ and $106_2$ but relatively short distance of cable between amplifiers $106_1$ and $106_3$, grouping the CMs by geography/distance to the CMTS may enable a lower transmit power to be used by the CMTS 102 when talking to service group 406 as compared to when talking to service group 408.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform processes described.

Accordingly, the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
   determining, by a cable modem termination system (CMTS), for a plurality of cable modems served by said CMTS, a corresponding plurality of signal-to-noise ratio (SNR) related metrics;
   assigning, by said CMTS, said plurality of cable modems among a plurality of service groups based on said plurality of SNR-related/metrics;
   generating, by said CMTS for each one of said plurality of service groups, a composite SNR-related metric based on a portion of said plurality of SNR-related metrics corresponding to said one of said plurality of service groups;
   selecting, by said CMTS, physical layer communication parameters to be used for communicating with said one of said plurality of service groups based on said composite SNR-related metric; and
   communicating, by said CMTS, with a portion of said plurality of cable modems corresponding to said one of said plurality of service groups using said selected physical layer communication parameters
   wherein:
   each of said SNR-related metrics is a signal-to-noise ratio (SNR) versus frequency profile; and
   said composite SNR related metric is a worst-case SNR versus frequency profile for said one of said plurality of service groups.

2. The method of claim 1, wherein said physical layer communication parameters include one or more of: transmit power, receive sensitivity, timeslot duration, modulation type, modulation order, forward error correction (FEC) type, and FEC code rate.

3. The method of claim 1, wherein said CMTS uses orthogonal frequency division multiplexing (OFDM) over a plurality of subcarriers for said communicating.

4. The method of claim 3, comprising selecting, by said CMTS, said physical layer communication parameters on a per-OFDM-subcarrier basis.

5. The method of claim 4, wherein said physical layer communication parameters include one or both of: which of said OFDM subcarriers to use for transmission to said CMTS, and which of said OFDM subcarriers to use for reception of information from said CMTS.

6. The method of claim 1, wherein:
   said plurality of service groups comprises a first service group and a second service group;
   said first service group has a first composite SNR versus frequency profile, said second service group has a second composite SNR versus frequency profile, and a third cable modem has a particular SNR versus frequency profile; and
   said assigning said plurality of cable modems among said plurality of service groups comprises:
   assigning said third cable modem to said first service group if said particular SNR versus frequency profile is more similar to said first composite SNR versus frequency profile than to said second composite SNR versus frequency profile; and assigning said third cable modem to said second service group if said particular SNR versus frequency profile is more similar to said second composite SNR versus frequency profile than to said first composite SNR versus frequency profile.

7. The method of claim 1, comprising assigning said plurality of cable modems among said plurality of service groups based on distances between said CMTS and said plurality of cable modems.

8. The method of claim 1, comprising assigning any particular one of said plurality of cable modems to one of said plurality of service groups based on which one or more of a plurality of branch amplifiers are upstream of said one of said plurality of cable modems.

9. The method of claim 1, wherein said determining said plurality of SNR-related metrics comprises:
   transmitting a probe message to each said plurality of cable modems, said probe message comprising instructions for measuring a metric and reporting said measured metric back to said CMTS and
   receiving a metric reporting message from each of said plurality of cable modems.

10. A system comprising:
    circuitry for use in a cable modem termination system (CMTS), said circuitry comprising a network interface and a processor wherein:
    said processor is configured to determine, for a plurality of cable modems served by said CMTS, a corresponding plurality of signal-to-noise ratio (SNR) related metrics;

said processor is configured to assign said plurality of cable modems among a plurality of service groups based on said plurality of SNR-related metrics;

said processor is configured to generate, for each one of said plurality of service groups, a composite SNR-related metric based on a portion of said plurality of SNR-related metrics corresponding to said one of said plurality of service groups;

said processor is configured to select physical layer communication parameters to be used for communicating with said one of said plurality of service groups based on said composite SNR-related metric; and said network interface is configured to communicate with a portion of said plurality of cable modems corresponding to said one of said plurality of service groups using the selected physical layer communication parameters wherein:

each of said SNR-related metrics is a signal-to-noise ratio (SNR) versus frequency profile; and said composite SNR related metric is a worst-case SNR versus frequency profile for said one of said plurality of service groups.

11. The system or claim 10, wherein said physical layer communication parameters include one or more of: transmit power, receive sensitivity, timeslot duration, modulation type, modulation order, forward error correction (FEC) type, and FEC code rate.

12. The system of claim 10, wherein said network interface and said plurality of cable modems are configured to communicate using orthogonal frequency division multiplexing (OFDM) over a plurality of subcarriers.

13. The system of claim 12, wherein said network interface is configured such that said physical layer communication parameters are configurable on a per-OFDM-subcarrier basis.

14. The system of claim 12, wherein said physical layer communication parameters include one or both of: which of said OFDM subcarriers to use for transmission to said CMTS, and which of said OFDM subcarriers to use for reception of information from said CMTS.

15. The system of claim 10, wherein:

said plurality of service groups comprises a first service group and a second service group;

said first service group has a first composite SNR versus frequency profile, said second service group has a second composite SNR versus frequency profile, and a third cable modem has a particular SNR versus frequency profile;

said assignment of said plurality of cable modems among said plurality of service groups comprises:

assignment of said third cable modem to said first service group if said particular SNR versus frequency profile is more similar to said first composite SNR versus frequency profile than to said second composite SNR versus frequency profile; and assignment of said third cable modem to said second service group if said particular SNR versus frequency profile is more similar to said second composite SNR versus frequency profile than to said first composite SNR versus frequency profile.

16. The system of claim 10, wherein said processor is configured to assign said plurality of cable modems among said plurality of service groups based on distances between said CMTS and said plurality of cable modems.

17. The system of claim 10, wherein said processor is configured to assign said plurality of cable modems among said plurality of service groups based on a branch further branch amplifier that serves each of said plurality of cable modems.

18. The system of claim 10, wherein said determination of said plurality of SNR-related metrics comprises:

transmission, via said network interface, of a probe message to each said plurality of cable modems, said probe message comprising instructions for measuring a metric and reporting said measured metric; back to said CMTS; and reception, via said network interface of said CMTS, of a metric reporting message from each of said plurality of cable modems.

* * * * *